(12) United States Patent
Chang

(10) Patent No.: US 9,568,582 B2
(45) Date of Patent: Feb. 14, 2017

(54) ELECTRONIC DEVICE

(71) Applicant: PEGATRON CORPORATION, Taipei (TW)

(72) Inventor: Huan-Chia Chang, Taipei (TW)

(73) Assignee: PEGATRON CORPORATION, Taipei (TW)

(*) Notice: Subject to any disclaimer, the term of this patent is extended or adjusted under 35 U.S.C. 154(b) by 73 days.

(21) Appl. No.: 14/685,597

(22) Filed: Apr. 14, 2015

(65) Prior Publication Data

US 2015/0334527 A1 Nov. 19, 2015

(30) Foreign Application Priority Data

May 14, 2014 (TW) .............................. 103116983 A

(51) Int. Cl.
| | |
|---|---|
| *H04W 24/00* | (2009.01) |
| *G01S 3/20* | (2006.01) |
| *H04W 4/02* | (2009.01) |
| *H04B 17/27* | (2015.01) |
| *H04B 17/318* | (2015.01) |

(52) U.S. Cl.
CPC ............ *G01S 3/20* (2013.01); *H04B 17/27* (2015.01); *H04W 4/023* (2013.01); *H04W 4/026* (2013.01); *H04W 4/027* (2013.01); *H04B 17/318* (2015.01)

(58) Field of Classification Search
CPC ...... H04W 64/00; H04W 4/02; H04W 64/003; H04W 64/006
USPC ................................ 455/456.1, 456.5, 456.6
See application file for complete search history.

(56) References Cited

U.S. PATENT DOCUMENTS

2014/0323161 A1* 10/2014 Sridhara .................. G01S 5/14
 455/456.6
2015/0133173 A1* 5/2015 Edge ........................ G01S 1/66
 455/456.6

FOREIGN PATENT DOCUMENTS

| CN | 101765201 A | 6/2010 |
|---|---|---|
| CN | 101828307 A | 9/2010 |
| CN | 102404843 A | 4/2012 |
| CN | 102523556 A | 6/2012 |
| CN | 102725764 A | 10/2012 |
| CN | 103237292 A | 8/2013 |

* cited by examiner

*Primary Examiner* — Temica M Beamer
(74) *Attorney, Agent, or Firm* — CKC & Partners Co., Ltd.

(57) ABSTRACT

An electronic device is disclosed. The electronic device comprises an antenna module, a direction detecting module and a signal processing module. The antenna module is provided for communicating with a wireless communication device. The direction detecting module is provided for detecting strength of N wireless signals that the antenna module received from a first offset angle to N-th offset angle with respect to the wireless communication device to determine a directivity of the wireless communication device, in which N is a positive integer larger than 1. The signal processing module is provided for comparing the offset angles corresponding to the strength of the N wireless signals at the directivity of the wireless communication device with a look-up table for obtaining an angle of the wireless communication device with respect to the electronic device.

10 Claims, 2 Drawing Sheets

ELECTRONIC DEVICE

CROSS-REFERENCE TO RELATED APPLICATIONS

This Non-provisional application claims priority under 35 U.S.C. §119(a) on Taiwan Patent Application No(s). 103116983 filed in May 14, 2014, the entire contents of which are hereby incorporated by reference.

BACKGROUND

Field of the Invention

This invention relates to a search system and, more particularly, to an electronic device provided for searching a wireless communication device.

Description of the Related Art

More and more consumer electronic device, such as earphone, MP3 player, mouse and so on, combine Bluetooth and/or IR communication due to the promotion of short-ranged communication technology, such as Bluetooth and IR. Moreover, a portable electronic device having a corresponding communication function, such as mobile phone, tablet or notebook and so on, can control the consumer electronic products. Transitionally, the consumer electronic products can combine with an electronic element, such as a buzzer or a light-emitting element. When the portable electronic device starts communicating with the consumer electronic products, the consumer electronic products can indicate a user where is the consumer electronic products located by the sound from the buzzer or the light emitted from the light-emitting element. However, when the consumer electronic product is located around the noisy or bright environment, the abovementioned method will not correctly present the location of the consumer electronic products in order to be found by the user.

SUMMARY

An aspect of the present invention relates to an electronic device. The electronic device comprises an antenna module, a direction detecting module and a signal processing module. The antenna module is provided for communicating with a wireless communication device. The direction detecting module is electrically connected with the antenna module for detecting strength of N wireless signals that the antenna module received from a first offset angle to N-th offset angle with respect to the wireless communication device to determine a directivity of the wireless communication device, in which N is a positive integer larger than 1. The directivity of the wireless communication device is a direction that the wireless communication device has a maximum receiving and transmitting signal strength. The signal processing module is electrically connected with the direction detecting module for comparing the offset angles corresponding to the strength of the N wireless signals at the directivity of the wireless communication device with a look-up table for obtaining an angle of the wireless communication device with respect to the electronic device.

According to an embodiment of the present invention, the difference of every two adjacent offset angles between the first offset angle and the N-th offset angle is (360/N) degrees.

According to an embodiment of the present invention, the direction detecting module distributes each of the strength of the N wireless signals to K threshold ranges for forming a signal strength distribution and comparing the signal strength distribution with the look-up table to determine the directivity of the wireless communication device in which K is a positive integer larger than 1.

According to an embodiment of the present invention, the directivity of the wireless communication device is located at one of M directions of a plane in which the difference of every two adjacent directions is (360/M) degrees and M is an integer larger than 1.

According to an embodiment of the present invention, the electronic device further comprises a storage module for storing the look-up table.

According to an embodiment of the present invention, the look-up table records the strength of the N wireless signal that the antenna module received from the first offset angle to the N-th offset angle with respect to the wireless communication module as the angle of the wireless communication device with respect to the electronic device is around zero and the directivity of the wireless communication device is located at each of the M directions of the plane.

According to an embodiment of the present invention, the signal processing module utilizes a distributed characteristic of the strength of the N wireless signal to obtain the angle of the wireless communication device with respect to the electronic device according to the directivity of the wireless communication device located at one of the M directions in the look-up table.

According to an embodiment of the present invention, the antenna module starts communicating with the wireless communication device when the electronic device is located at a maximum predetermined distance of the wireless communication device that is able to communicate.

According to an embodiment of the present invention, the direction detecting module further comprises an electronic compass, a gyroscope or an acceleration sensor for obtaining a deflection angle of the electronic device with respect to a terrestrial magnetism.

According to an embodiment of the present invention, the electronic device further comprises a global position system for acquiring positioning information of the electronic device and for marking a position of the wireless communication device in an electronic map according to the angle of the wireless communication device with respect to the electronic device and the deflection angle of the electronic device with respect to the terrestrial magnetism.

To sum up, the user can obtain the angle between the electronic device and the wireless communication device trough the direction detecting module and the signal processing module. In addition, a position of the wireless communication device with respect to the electronic device can be further obtained by starting to detect the wireless signals transmitted from the wireless communication module as a distance between the electronic device and the wireless communication device is a maximum predetermined distance that is able to communicate. Thus, the electronic device also can obtain the position of the wireless communication device even though the wireless communication device is not provided with the buzzer or the light-emitting element and such the situation, which the wireless communication device cannot be found under the noisy or bright environment, will be avoided.

BRIEF DESCRIPTION OF THE DRAWINGS

To allow the abovementioned and other purposes, features, advantages and embodiments of the present invention to be clear and understood, attached figures are described as follows.

DETAILED DESCRIPTION

Figure 1:
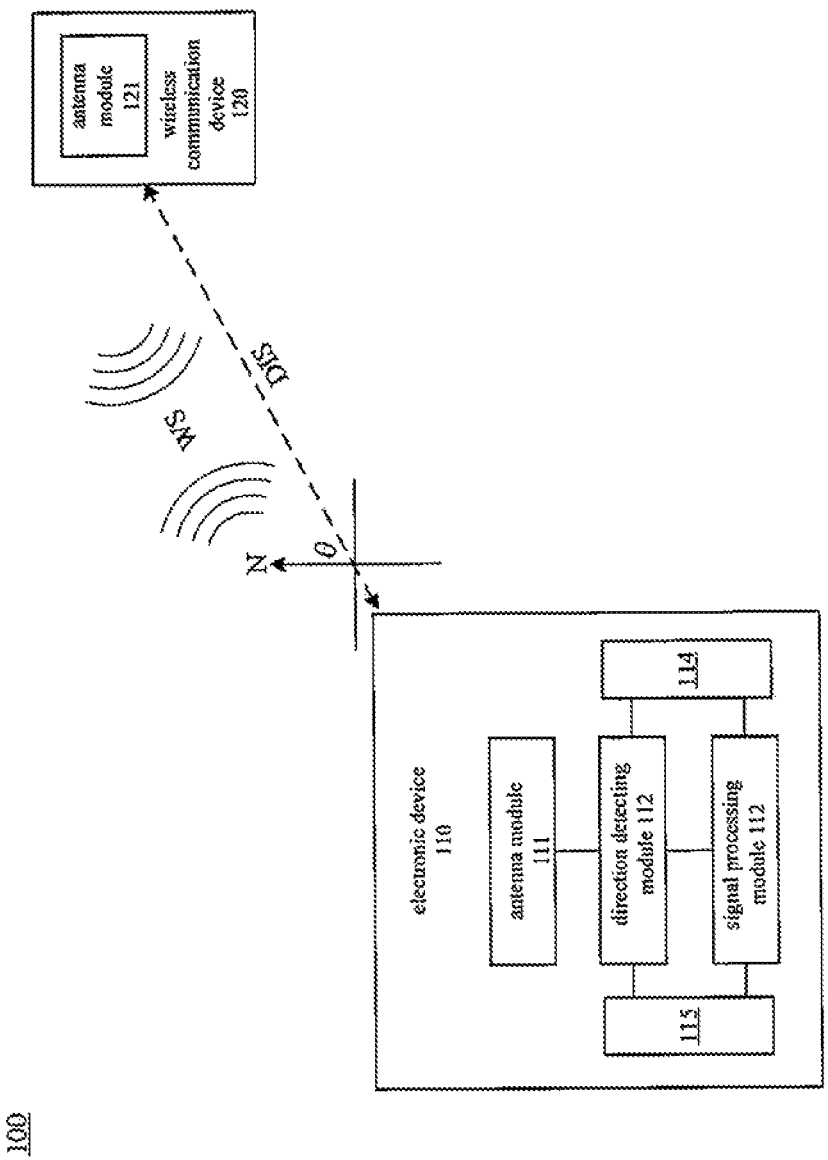
FIG. 1 is a block diagram showing a search system according to an embodiment of the present invention.

The following drawings disclose the present invention several embodiments, for clear illustration, many details of the practice will be described in the following description. However, should understand that the details of these are not practical on the application to limit the present invention. That is, in some embodiments of the invention, the practical details on these non-essential. In addition, to simplify the drawings for the sake of some conventional structures and conventional components in the drawings will be simple in schematic manner depicted.

Please refer to FIG. 1. FIG. 1 is a block diagram showing a search system 100 according to an embodiment of the present invention. The search system 100 comprises an electronic device 110 and a wireless communication device 120. The electronic device 110 is provided for searching a position of the wireless communication device 120. The wireless communication device 120 comprises an electronic device having a Bluetooth communication function, an infrared communication function or a Zigbee communication function, such as earphone, horn, mouse, keyboard and so on. The electronic device 110 comprises a portable electronic device that is able to communicate with the wireless communication device 120, such as mobile phone, personal digital assistant (PDA), tablet or notebook.

In an embodiment, the electronic device 110 comprises an antenna module 111, a direction detecting module 112 and a signal processing module 113. The antenna module 111 is provided for communicating with the wireless communication device 120. The direction detecting module 112 is provided for detecting strength of N wireless signals WS that the antenna module 111 received from a first offset angle to N-th offset angle with respect to the wireless communication device 120 so as to determine a directivity of the wireless communication device 120, in which N is a positive integer larger than 1. In an embodiment, the directivity of the wireless communication device 120 is a direction that the wireless communication device 120 has a maximum receiving and transmitting signal strength. The signal processing module 113 is provided for comparing the offset angles corresponding to the strength of the N wireless signals WS at the directivity of the wireless communication device 120 with a look-up table for obtaining an angle θ of the wireless communication device 120 with respect to the electronic device 110 as the direction that the electronic device 110 has the maximum receiving and transmitting signal strength is located at one direction. In FIG. 1, the direction that the electronic device 110 has the maximum receiving and transmitting signal strength is due north. However, the present embodiment is not limited thereto.

In particular, the antenna module 111 starts communicating with the wireless communication module 120 when the electronic device 110 is located at a maximum predetermined distance DIS from the wireless communication device 120 that is able to communicate. That is, the antenna module 11/ starts receiving the wireless signals WS transmitted from the wireless communication module 120. Thus, the electronic device 110 can obtain the angle θ of the wireless communication device 120 with respect to the electronic device 110 through the abovementioned implement when the distance between the electronic device 110 and the wireless communication device 120 is the maximum predetermined distance DIS. And then, a position of the wireless communication device 120 with respect to the electronic device 110 can be decided by the distance and the angle of them. Therefore, it is still able to detect the position of the wireless communication device 120 with respect to the electronic device 110 through the abovementioned implement without the additional buzzer or light-emitting element.

In an embodiment, the maximum predetermined distance DIS is decided according to the wireless communication function of the wireless communication device 120. For example, the maximum predetermined distance DIS can be 8 meters if the wireless communication device 120 is a device having the Bluetooth communication function.

In particular, the wireless communication device 120 also comprises an antennal module 121 for transmitting the wireless signals WS. The antenna module 121 has a maximum receiving and transmitting strength of the wireless signals WS at a specific direction so that the specific direction is the directivity of the wireless communication device 120. Thus, if the distance between the electronic device 110 and the wireless communication device 120 is keep consistent, the strength of the wireless signals WS, which the antenna module 111 is able to receive, will be different as the direction, which the antenna module 121 is able to receive and transmit the maximum wireless signal WS, is different (namely the directivity of the wireless communication device 120).

In an embodiment, the directivity of the wireless communication device 120 is able to be one of M directions on a plane, in which the difference of every two adjacent directions is (360/M) degrees and M is an integer larger than 1. When the direction detecting module 112 detects the wireless signal WS, the user can utilize a direction perpendicular to a floor as an axis to allow the electronic device 110 to rotate 360 degrees in clockwise direction or counterclockwise direction. In the present embodiment, the electronic device 110 rotates in clockwise direction. However, the present embodiment is not limited thereto. In the meanwhile, with respect to the direction that the electronic device 110 has the maximum receiving and transmitting signal strength is a specific direction (for example, due north), the rotated 360 degrees can be divided into N offset angles and the difference of every two adjacent offset angles is (360/N) degrees. For example, when N is equal to 8, the first offset angle is an angle rotating 45 degrees in clockwise direction as the direction that the electronic device 110 has the maximum receiving and transmitting signal strength is due north and so forth. The seventh offset angle is an angle rotating 315 degrees in clockwise direction (that is, it is to rotate 45 degrees in counterclockwise direction) as the direction that the electronic device 110 has the maximum receiving and transmitting signal strength is due north.

Then, the direction detecting module 112 is capable of detecting the strength of the N wireless signals WS that the antenna module 111 received from the first offset angle to the N-th offset angle with respect to the wireless communication device 120. And then, the direction detecting module 112 can determine the directivity of the wireless communication device 120 is located at which of the M directions according to the strength of the N wireless signals WS.

Figure 2:
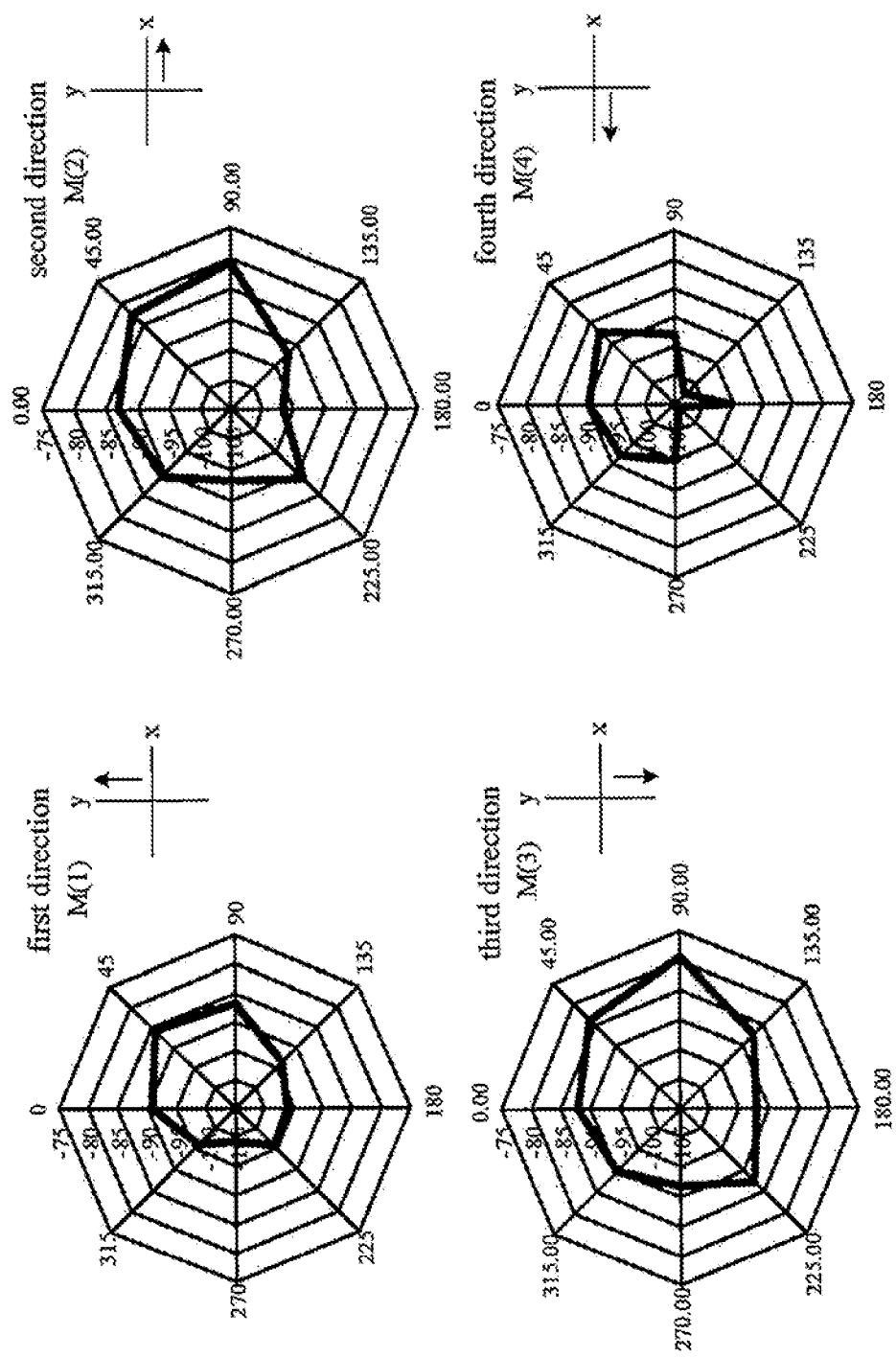
FIG. 2 is a relation diagram of strength of N wireless signals and a directivity of a wireless communication device according to an embodiment of the present invention.

Please also refer to FIG. 2. FIG. 2 is a relation diagram of strength of N wireless signal and a directivity of a wireless communication device according to an embodiment of the present invention. In the present embodiment, it supposes that the directivity of the wireless communication device 120 is one of four directions and the direction detecting module 112 can detect 8 wireless signals WS. That is, M is equal to 4 and N is equal to 8. However, the values of M and N are only utilized as examples and the present invention is not limited thereto.

As shown in FIG. 2, four figures represent, respectively, that the strength of 8 wireless signals WS, which the electronic device 110 receives from the first offset angle N(1) to the eighth offset angle N(8) after rotating 360 degrees, when the directivity of the wireless communication device 120 is located at a first direction M(1) (the direction that the antenna module 121 can transmit the maximum wireless signal WS is located at an upward direction of y axis, that is, zero degree), a second direction M(2) (the direction that the antenna module 121 can transmit the maximum wireless signal WS is located at a right direction of x axis, that is, 90 degrees), a third direction M(3) (the direction that the antenna module 121 can transmit the maximum wireless signal WS is located at a downward direction of y axis, that is, 180 degrees) and a fourth direction M(4) (the direction that the antenna module 121 can transmit the maximum wireless signal WS is located at a left direction of x axis, that is, 270 degrees). In the present embodiment, the direction that the electronic device 110 has the maximum receiving and transmitting signal strength is due north. However, the present invention is not limited thereto. As shown in FIG. 2, the strength of the wireless signals WS that the direction detecting module 112 detected at each of the offset angles are obviously different when the directivity of the wireless communication device 120 is located at different direction. That is, when the antenna module 111 receives the wireless signals WS of the N offset angles from the first offset angle to the N-th offset angle, the direction detecting module 112 can determine the directivity of the wireless communication device 120 is located at which of the M directions according to the strength of the N wireless signals WS. That is, the directivity of the wireless communication device 120 is obtained.

In an embodiment, the direction detecting module 112 can further distributes each of the strength of the N wireless signals WS to K threshold ranges. The strength of the N wireless signals WS is able to form a signal strength distribution according to the limitation of the K threshold ranges, in which K is a positive integer larger than 1. For each of directions, the signal strength distribution formed by the strength of the N wireless signals WS from the corresponding first offset angle to N-th offset angle has totally $K^N$ combinations. That is to say, the larger the value of K or N is, the higher the independence of the signal strength distribution will be. Thus, the direction detecting module 112 can obtain the directivity of the wireless communication device 120 according to the signal strength distribution.

In an embodiment, the electronic device 110 further comprises a storage module 114. The storage module 114 is provided for storing the look-up table. The look-up table records the strength of the N wireless signal that the antenna module 111 received from the first offset angle to the N-th offset angle with respect to the wireless communication module 120 as the angle of the wireless communication device 120 with respect to the electronic device 110 is around zero and the directivity of the wireless communication device 120 is located at each of directions, and records the signal strength distribution formed by the strength of the N wireless signals WS according to the K threshold ranges. Please refer to table 1, which is a look-up table drawn according to an embodiment of the present invention.

Taking the present embodiment as an example, M is equal to 8 and N is equal to 8. It supposes that K is equal to 3, a first threshold range K (1) is ranged from −79 to −87 dB, a second threshold range K (2) is ranged from −88 to −98 dB and a third threshold range K (3) is ranged from −99 to −104 dB. For the first direction M (1), the signal strength distribution, which is formed by the wireless signals WS of 8 different offset angles thereof, comprises two first threshold ranges K (1), five second threshold ranges K (2) and a third threshold range K (3). For the eight direction M (8), the signal strength distribution, which is formed by the wireless signals WS of 8 different offset angles thereof, comprises two first threshold ranges K (1), six second threshold ranges K (2) and zero third threshold range K (3) and so forth. Thus, the direction detecting module 112 will transform the strength of the wireless signals WS of N directions that the antenna module detected to the signal strength distribution and compare the signal strength distribution with the look-up table to determine that the directivity of the wireless communication device 120 is located at which of the directions.

TABLE 1 look-up table

| | | Direction (wireless communication device 120) | | | | | | | |
|---|---|---|---|---|---|---|---|---|---|
| | | M(1) 0° | M(2) 45° | M(3) 90° | M(4) 135° | M(5) 180° | M(6) 225° | M(7) 270° | M(8) 315° |
| offset angle (electronic device 110) | N(1) 0° | −90.8 | −93.3 | −87.6 | −93 | −87.9 | −91.1 | −90.5 | −91.5 |
| | N(2) 45° | −85.9 | −87.5 | −82.3 | −95.8 | −83.7 | −84.1 | −87.1 | −84.1 |
| | N(3) 90° | −86.7 | −86.2 | −80.5 | −90.6 | −79.4 | −100.1 | −92.8 | −86.9 |
| | N(4) 135° | −93.5 | −93.7 | −92.3 | −94.3 | −87.2 | −89.1 | −102.7 | −97.7 |
| | N(5) 180° | −96.5 | −96.9 | −96.7 | −97.9 | −92.2 | −101 | −96 | −95.2 |
| | N(6) 225° | −92.2 | −91.3 | −88.7 | −92.1 | −87.3 | −92 | −104 | −92 |
| | N(7) 270° | −99.1 | −98.4 | −93.3 | −94.3 | −91.8 | −90.7 | −95 | −96 |
| | N(8) 315° | −96.2 | −94.6 | −89.3 | −88 | −90 | −89.3 | −92 | −90.8 |

TABLE 1-continued look-up table

| | | Direction (wireless communication device 120) | | | | | | | |
|---|---|---|---|---|---|---|---|---|---|
| | | M(1) 0° | M(2) 45° | M(3) 90° | M(4) 135° | M(5) 180° | M(6) 225° | M(7) 270° | M(8) 315° |
| signal strength distribution | K(1) | 2 | 1 | 3 | 1 | 2 | 1 | 0 | 2 |
| | K(2) | 5 | 6 | 5 | 7 | 6 | 5 | 6 | 6 |
| | K(3) | 1 | 1 | 0 | 0 | 0 | 2 | 2 | 0 |

After the directivity of the wireless communication device 120 located at which of the directions is obtained through the direction detecting module 112, the signal processing module 113 is able to compare the offset angles corresponding to the strength of the N wireless signals WS with the look-up table under the directivity of the wireless communication device 120 for obtaining an angle of the wireless communication device 120 with respect to the electronic device 110.

In particular, please refer to table 1, the signal processing module 113 can utilize a distributed characteristic of the strength of the N wireless signals WS to obtain the angle of the wireless communication device 120 with respect to the electronic device 110 when the directivity of the wireless communication device 120 is located at one of the M directions, that is, one of the M directions in the look-up table.

Taking the look-up table of table 1 as an example, when the directivity of the wireless communication device 120 is located at the first direction M (1) that corresponds to the strength of the 8 wireless signals WS of the first direction M(1) in the look-up table, the wireless signals of the second offset angle N(2) and the third offset angle N(3) are much larger than other wireless signals. Thus, by means of such the distribution characteristic, when the directivity of the wireless communication device 120 is located at the first direction M (1) and the direction detecting module 112 detects that continuously maximum signal strength are occurred at X degrees and Y degrees, such as 180 degrees and 225 degrees, the signal processing module 113 will sum the detected angles (such as 405 degrees), subtract the second offset angle (namely 45 degrees) and the third offset angle (namely 90 degrees), and then divide by 2. That is, the angle, such as 135 degrees, of the wireless communication device 120 with respect to the electronic device 110 can be obtained through an equation ((X+Y−45−90)/2). Because the look-up table is detected when the angle of the wireless communication device 120 with respect to the electronic device 110 is around zero, the user can rotate the electronic device 110 in counterclockwise direction when the obtained angle is positive so as to allow the angle of the wireless communication device 120 with respect to the electronic device 110 to be around zero. That is, the wireless communication device is opposed to the electronic device 110. And then, the position of the wireless communication device 120 with respect to the electronic device 110 can be obtained according to the distance between the wireless communication device 120 and the electronic device 110 (namely the maximum predetermined distance, DIS).

In an embodiment, taking the look-up table of table 1 as an example, when the directivity of the wireless communication device 120 is located at the first direction M (1), the second direction M (2), the third direction M (3), the fifth direction M (5) and the eighth direction M (8) and if the angle of the maximum wireless signal and the angle of the second maximum wireless signal that the direction detecting module 112 is able to detect are MAX1 and MAX2, the angle of the wireless communication device 120 and the electronic device 110 is ((MAX1+MAX2−45−90)/2). When the angle is positive, it is able to rotate the electronic device 110 in counterclockwise direction. Otherwise, it is able to rotate the electronic device 110 in clockwise direction when the angle is negative. And then, the angle of the wireless communication 120 with respect to the electronic device 110 is around zero.

In an embodiment, taking the look-up table of table 1 as an example, when the directivity of the wireless communication device 120 is located at the fourth direction M (4) and if the angle of the minimum wireless signal that the direction detecting module 112 is able to detect is MIN1, the angle of the wireless communication device 120 and the electronic device 110 is (MIN1-315). When the angle is positive, it is able to rotate the electronic device 110 in counterclockwise direction. Otherwise, it is able to rotate the electronic device 110 in clockwise direction when the angle is negative. And then, the angle of the wireless communication 120 with respect to the electronic device 110 is around zero.

In an embodiment, taking the look-up table of table 1 as an example, when the directivity of the wireless communication device 120 is located at the sixth direction M (6) and if the angle of the maximum wireless signal that the direction detecting module 112 is able to detect is MAX3, the angle of the wireless communication device 120 and the electronic device 110 is (MAX3-45). When the angle is positive, it is able to rotate the electronic device 110 in counterclockwise direction. Otherwise, it is able to rotate the electronic device 110 in clockwise direction when the angle is negative. And then, the angle of the wireless communication 120 with respect to the electronic device 110 is around zero.

In an embodiment, taking the look-up table of table 1 as an example, when the directivity of the wireless communication device 120 is located at the seventh direction M (7) and if the angle of the minimum wireless signal and the angle of the second minimum wireless signal that the direction detecting module 112 is able to detect are MIN2 and MIN3, the angle of the wireless communication device 120 and the electronic device 110 is ((MIN2+MIN3−135−225)/2). When the angle is positive, it is able to rotate the electronic device 110 in counterclockwise direction. Otherwise, it is able to rotate the electronic device 110 in clockwise direction when the angle is negative. And then, the angle of the wireless communication 120 with respect to the electronic device 110 is around zero.

In an embodiment, the direction detecting module 112 further comprises a device for detecting the angle, such as an electronic compass, a gyroscope or an acceleration sensor. Thus, the direction detecting module 112 can obtain a deflection angle of the electronic device 110 with respect to a terrestrial magnetism through the electronic compass.

In an embodiment, the electronic device 110 further comprises a global position system 115. The global position system 115 is provided for acquiring positioning information of the electronic device 110 and for marking a position of the wireless communication device 120 in an electronic map according to the angle of the wireless communication device 120 with respect to the electronic device 110 and the deflection angle of the electronic device 110 with respect to the terrestrial magnetism.

By means of the abovementioned embodiments, the user can obtain the angle of the electronic device 110 and the wireless communication device 120 through the direction detecting module 112 and the signal processing module 113. In addition, a position of the wireless communication device 120 with respect to the electronic device 110 can be further obtained by starting to detect the wireless signals transmitted from the wireless communication module 120 as a distance between the electronic device 110 and the wireless communication device 120 is a maximum predetermined distance that is able to communicate. Thus, the electronic device 110 also can obtain the position of the wireless communication device 120 even though the wireless communication device is not provided with the buzzer or the light-emitting element and such the situation, which the wireless communication device 120 cannot be found under the noisy or bright environment, will be avoided.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device, comprising:
   an antenna module provided for communicating with a wireless communication device;
   a direction detecting module electrically connected with the antenna module for detecting strength of N wireless signals that the antenna module received, respectively, from a first offset angle to N-th offset angle with respect to the wireless communication device to determine a directivity of the wireless communication device, wherein the directivity of the wireless communication device is a direction that the wireless communication device has a maximum receiving and transmitting signal strength and N is a positive integer larger than 1, and the difference of every two adjacent offset angles between the first offset angle and the N-th offset angle is (360/N) degrees; and
   a signal processing module electrically connected with the direction detecting module for comparing the offset angles corresponding to the strength of the N wireless signals at the directivity of the wireless communication device with a look-up table for obtaining an angle of the wireless communication device with respect to the electronic device;
   wherein the direction detecting module distributes each of the strength of the N wireless signals to K threshold ranges for forming a signal strength distribution and compares the signal strength distribution with the look-up table to determine the directivity of the wireless communication device in which K is a positive integer lager than 1.

2. The electronic device according to claim 1, wherein the directivity of the wireless communication device is located at one of M directions of a plane in which the difference of every two adjacent directions is (360/M) degrees and hi is an integer larger than 1.

3. The electronic device according to claim 2, wherein the look-up table records the strength of the N wireless signals that the antenna module received from the first offset angle to the N-th offset angle with respect to the wireless communication module as the angle of the wireless communication device with respect to the electronic device is around zero and the directivity of the wireless communication device is located at each of the M directions of the plane.

4. The electronic device according, to claim 3, wherein the signal processing module utilizes a distributed characteristic of the strength of the N wireless signals to obtain the angle of the wireless communication device with respect to the electronic device according, to the directivity of the wireless communication device located at one of the M directions in the look-up table.

5. The electronic device according, to claim 2 further comprising a storage module for storing the look-up table.

6. The electronic device according to claim 5, wherein the look-up table records the strength of the N wireless signals that the antenna module received from the first offset angle to the N-th offset angle with respect to the wireless communication module as the angle of the wireless communication device with respect to the electronic device is around zero and the directivity of the wireless communication device is located at each of the M directions of the plane.

7. The electronic device according to claim 6, wherein the signal processing module utilizes a distributed characteristic of the strength of the N wireless signals to obtain the angle of the wireless communication device with respect to the electronic device according, to the directivity of the wireless communication device located at one of the M directions in the look-up table.

8. The electronic device according to claim 1, Wherein the antenna module starts communicating with the wireless communication device when the electronic device is located at a maximum predetermined distance of the wireless communication device that is able to communicate.

9. The electronic device according to claim 1, wherein the direction detecting module further comprises an electronic compass, a gyroscope or an acceleration sensor for obtaining a deflection angle of the electronic device with respect to a terrestrial magnetism.

10. The electronic device according to claim 9 further comprising a global position system for acquiring positioning information of the electronic device and for marking a position of the wireless communication device in an electronic map according to the angle of the wireless communication device with respect to the electronic device and the deflection angle of the electronic device with respect to the terrestrial magnetism.

* * * * *